Aug. 16, 1949.                    N. FLESCH                    2,479,332
                            BRAKE HEAD ARRANGEMENT
                            Filed Aug. 7, 1944
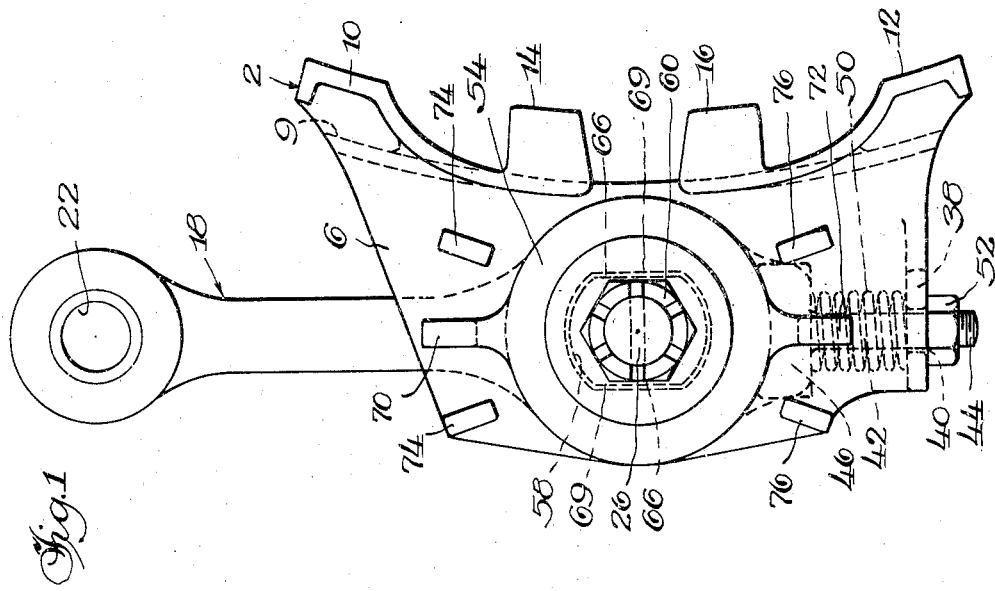
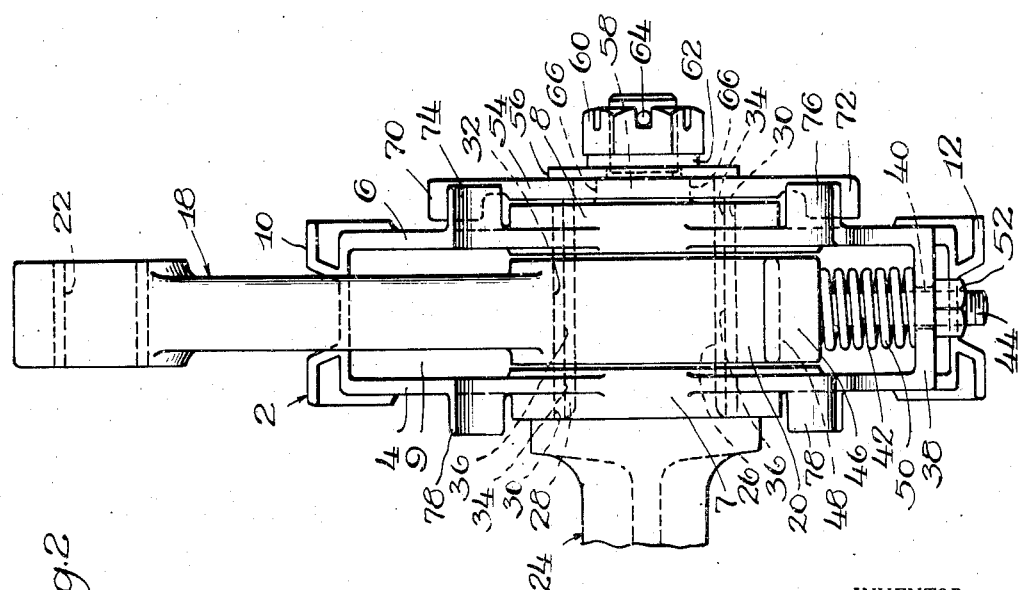
INVENTOR.
Norman Flesch
BY
Orrin O.B. Garner
Atty.

Patented Aug. 16, 1949

2,479,332

UNITED STATES PATENT OFFICE 2,479,332

BRAKE HEAD ARRANGEMENT

Norman Flesch, Chicago, Ill., assignor to American Steel Foundries, Chicago, Ill., a corporation of New Jersey Application August 7, 1944, Serial No. 548,348

7 Claims. (Cl. 188—221.1)

My invention relates to railway brake equipment and more particularly to mechanism for automatically adjusting and maintaining a brake head and an associated shoe substantially concentric with the periphery of a wheel such mechanism being commonly known as a brake head balancing device.

An object of my invention is to provide a brake head balancing device of practical form and suitable for convenient application to a brake head utilized in a clasp or a single shoe brake arrangement for a railway car truck.

Another object of my invention is to provide a novel brake head balancing device having means for frictionally resisting the rotation of a brake head at its point of connection to an associated pivot member.

A specific object of my invention is to design a brake head balancing device capable of developing friction between the bearing portion of a brake hanger and the brake head, said hanger bearing portion and said brake head having a pivotal connection to an associated pivot member.

A different object of my invention is to provide a novel brake head balancing device having stop means preventing pivotal movement of the brake head on an associated pivot member beyond predetermined limits necessary for engagement of the braking surface of the brake shoe with the periphery of the wheel.

My invention comprehends a brake head of novel form comprising spaced side walls and transverse walls extending therebetween, one of said transverse walls having end and intermediate brake shoe lugs on one side thereof and the other transverse wall forming a seat for associated friction means.

My invention also comprehends a novel brake head construction comprising a brake head having spaced walls with stop lugs formed integral therewith cooperative with stop lugs of a plate, said brake head having a pivotal connection with an associated pivot member and said plate having a fixed connection to said member.

In the drawings, Figure 1 is a side elevation of a brake mechanism embodying my invention. Figure 2 is an elevation taken from the left as seen in Figure 1.

Describing my invention in detail, the brake head, generally designated 2, comprises the spaced side walls 4 and 6 providing parallel bearing portions 7 and 8, respectively, said side walls having a transverse wall 9 extending therebetween and merging therewith, said transverse wall also merging with spaced end or toe lugs 10 and 12 as well as spaced intermediate lugs 14 and 16, all of said lugs being formed and arranged for connection to an associated brake shoe in the conventional manner.

The hanger, generally designated 18, is in the form of a connecting rod with the bearing portion 20 extending between the spaced walls 4 and 6 of the brake head, the upper end of the hanger having a bushed opening 22 for pivotal connection to associated supporting means.

The brake beam, generally designated 24, is provided with a trunnion end 26 carrying a bushing 28 press-fitted thereon. The trunnion end 26 extends through aligned openings 30, 30 in the brake head bearing portions 7 and 8, respectively, and through an opening 32 in the hanger bearing portion 20, the openings 30, 30 being bushed as at 34, 34 and the opening 32 being bushed at 36.

In order to control pivotal movement of the brake head 2 on the trunnion end 26 to maintain the braking surface of the brake shoe (not shown) in concentricity with the periphery of an associated wheel (not shown) and also to prevent uneven wear of the brake shoe, I have provided yieldable means, which are interposed between the brake hanger and the brake head, for frictionally resisting the pivoting of the brake head on or about the trunnion end of the brake beam to thereby hold the brake head in an adjusted position, or any other, which it may assume in accordance with working conditions. To this end, the brake head is formed with a bottom wall 38 between the side walls 4 and 6 and merging therewith, said wall having an opening 40 therein for reception of the shank 42 of a bolt-like member 44. The head of the member 44 is formed to provide a friction block 46 having an arcuate friction surface 48 in complementary frictional engagement with the outer cylindrical surface of the bearing portion 20 of the hanger 18. Coiled around the shank 42 of the member 44 is a spring 50 which is confined between the friction block and the wall 38 of the brake head 2, said spring being of suitable strength to produce sufficient friction between the engaged surfaces of the friction block 46 and the hanger 18 to normally hold the brake head on the trunnion end in an adjusted position but adapted to yield and permit the engaged surfaces to slide upon each other when further adjustment is effected by application of the brake shoe to the periphery of the wheel. By means of this arrangement, the brake head normally is yieldably held in proper position and at the same time is permitted automatically to adjust itself in accordance with operating conditions.

The hanger 18 and the brake head 2 are held against displacement axially of the trunnion end 26 of the brake beam by positioning a perforated plate or washer 54 on the trunnion end 26 in abutment with the periphery of the bushing 28 extending outwardly from the bearing portion 8 of the head 2 and another washer 56 on a reduced threaded portion 58 of the trunnion end 26 in engagement with the washer 54, said washers 54 and 56 being urged into engagement with each other and also the bushing 28 and the trunnion end portion 58, respectively, by a nut 60 threaded on the portion of the trunnion end 26. A lock washer 62, interposed between the nut 60 and the washer 56, and a suitable key 64, cooperative with the trunnion end 26 and the nut 60, may be used for holding the nut 60 in a desired position.

In order to prevent pivotal movement of the brake head on the trunnion end 26 of the beam beyond predetermined limits necessary for engagement of the braking surface of the brake shoes with the wheel, stop means for effecting this result are provided between the trunnion end 26 and the brake head 2. More particularly, the trunnion end 26 of the beam, surrounded by the washer 54, is formed with flat parallel spaced surfaces 66 engaging similar internal surfaces 68 of the washer 54, thus preventing rotation of the washer on the trunnion end 26 of the beam. The washer 54 is provided with outwardly extending stop lugs 70 and 72 in vertical alignment and positioned between the brake head stop lugs 74 and 76, respectively, said lugs 74 and 76 being integral with the wall 6 of the brake head 2. It will be apparent that relative movement between the brake head and the trunnion end 26 of the beam will be restricted by the engagement of the stop lugs of the washer 54 and the brake head within limits permitting the shoe to be adjusted into a position concentric to the periphery of the wheel. It may be noted that the brake head is formed with stop lugs 78 on the wall 8 thereof to permit the brake head to be indiscriminately mounted on either side of the wheel.

In assembling my novel brake head balancing device, the spring 50 is placed under compression by rotation of the nut 52 on the threaded end of the bolt 44 so that the friction block 20 of the bolt will not interfere with the assembly of the device. The brake head and brake hanger are placed in assembled relationship with the openings 30, 30 in alignment with the opening 32. The head and hanger are then slipped on the trunnion end 26 of the beam and thereafter the nut 52 may be backed off of the bolt 44 so that the spring 50 will cause the friction block to operatively engage the hanger. The washers 54, 56 and 62 are then positioned on the trunnion end 26 of the beam in the order named and the nut 60 threaded on the trunnion end 26.

It is to be understood that I do not wish to be limited by the exact embodiment of the device shown which is merely by way of illustration and not limitation as various and other forms of the device will, of course, be apparent to those skilled in the art without departing from the spirit of the invention or the scope of the claims.

I claim:

1. In a brake head balancing device, a brake head having spaced side walls and transverse walls extending therebetween, one of said transverse walls being adapted to receive a brake shoe and the other transverse wall forming a support, a hanger having a bearing portion disposed between the side walls of said head, a pivot member extending within aligned openings in said side walls and said bearing portion, friction means carried by said support and in frictional engagement with said bearing portion, and means for limiting lateral and pivotal movement of said head on said member, said means comprising fixed abutment means on said member at one end thereof adjacent one of said walls for engagement therewith, a plate having an opening receiving the other end of said member, said last-mentioned end of said member being formed noncircular in cross section and having complementary engagement with said plate, means for maintaining said plate in assembly with said member, and interengaging rigid stop means carried by said plate and the other of said walls for limiting pivotal movement of said head on said member.

2. In a brake head balancing device, a brake head having spaced side walls and transverse walls extending therebetween, one of said transverse walls being adapted to receive a brake shoe and the other transverse wall forming a support, a hanger having a bearing portion disposed between the side walls of said head, a pivot member extending within aligned openings in said side walls and said bearing portion, friction means carried by said support and in frictional engagement with said bearing portion, means for limiting lateral and pivotal movement of said head on said member, said means comprising fixed abutment means on said member at one end thereof adjacent one of said walls for engagement therewith, a plate having an opening receiving the other end of said member, said last-mentioned end of said member being formed noncircular in cross section and having complementary engagement with said plate, means for maintaining said plate in assembly with said member, stop lugs on said plate, and stop lugs on the other of said side walls cooperable with the lugs on said plate for limiting pivotal movement of said brake head on said pivot member.

3. In a brake head balancing device, a brake head having spaced side walls and transverse walls extending therebetween, one of said transverse walls being adapted to receive a brake shoe and the other transverse wall forming a support, a hanger having a bearing portion disposed between the side walls of said head, a pivot member extending within aligned openings in said side walls and said bearing portion, friction means carried by said support and in frictional engagement with said bearing portion, means for limiting lateral and pivotal movement of said head on said member, said means comprising fixed abutment means on said member at one end thereof adjacent one of said walls for engagement therewith, a plate having an opening receiving the other end of said member, said last-mentioned end of said member being formed noncircular in cross section and having complementary engagement with said plate, means for maintaining said plate in assembly with said member, and interengaging stop means carried by said plate and the other of said walls for limiting pivotal movement of said head on said member.

4. In a brake head balancing device, an assembly including a brake head member and a hanger member, a pivot element extending through said members affording a pivotal connection therebetween, friction means carried by one of said members in frictional engagement with the other of said members, means for limiting lateral movement of said assembly on said element, said means comprising abutment means on said element adjacent one side of said assembly, a plate at the opposite side of said assembly, a non-circular portion on said element extending through a complementary opening in said plate and in engagement therewith along complementary surfaces, means for maintaining said plate in assembly with said element, and means for limiting pivotal movement of said head member on said element comprising interengaging rigid stops carried by said plate and said head member.

5. In a brake head balancing device, a bisymmetrical brake head having spaced side walls and transverse walls extending therebetween, one of said transverse walls being adapted to receive a brake shoe and the other transverse wall forming a support, a hanger having a bearing portion disposed between the side walls of said head, a pivot member extending within aligned openings in said side walls and said bearing portion, friction means carried by said support and in frictional engagement with said bearing portion, and means for limiting lateral and pivotal movement of said head on said member, said means comprising fixed abutment means on said member at one end thereof adjacent one of said walls for engagement therewith, a plate having an opening receiving the other end of said member, said last-mentioned end of said member being formed noncircular in cross section and having complementary engagement with said plate, means for maintaining said plate in assembly with said member, and interengaging rigid stop means carried by said plate and the other of said walls for limiting pivotal movement of said head on said member, said head being adapted for mounting on a pivot member on either side of an associated truck frame.

6. In a brake head balancing device, a bisymmetrical brake head having spaced side walls and transverse walls extending therebetween, one of said transverse walls being adapted to receive a brake shoe and the other transverse wall forming a support, a hanger having a bearing portion disposed between the side walls of said head, a pivot member extending within aligned openings in said side walls and said bearing portion, friction means carried by said support and in frictional engagement with said bearing portion, means for limiting lateral and pivotal movement of said head on said member, said means comprising fixed abutment means on said member at one end thereof adjacent one of said walls for engagement therewith, a plate having an opening receiving the other end of said member, said last-mentioned end of said member being formed noncircular in cross section and having complementary engagement with said plate, means for maintaining said plate in assembly with said member, stop lugs on said plate, and stop lugs on the other of said walls cooperable with the lugs on said plate for limiting pivotal movement of said brake head on said pivot member, said head being adapted for mounting on a pivot member on either side of an associated truck frame.

7. In a brake head balancing device, a bisymmetrical brake head having spaced side walls and transverse walls extending therebetween, one of said transverse walls being adapted to receive a brake shoe and the other transverse wall forming a support, a hanger having a bearing portion disposed between the side walls of said head, a pivot member extending within aligned openings in said side walls and said bearing portion, friction means carried by said support and in frictional engagement with said bearing portion, means for limiting lateral and pivotal movement of said head on said member, said means comprising fixed abutment means on said member at one end thereof adjacent one of said walls for engagement therewith, a plate having an opening receiving the other end of said member, said last-mentioned end of said member being formed noncircular in cross section and having complementary engagement with said plate, means for maintaining said plate in assembly with said member, and interengaging stop means carried by said plate and the other of said walls for limiting pivotal movement of said head on said member, said head being adapted for mounting on a pivot member on either side of an associated truck frame.

NORMAN FLESCH.

REFERENCES CITED

The following references are of record in the file of this patent:

UNITED STATES PATENTS

| Number | Name | Date |
|---|---|---|
| 533,559 | Robischung | Feb. 5, 1895 |
| 1,199,869 | Burton | Oct. 3, 1916 |
| 1,325,516 | Hedgcock | Dec. 23, 1919 |
| 2,010,531 | Baselt | Aug. 6, 1935 |